W. G. GAGNE.
COLLAPSIBLE SWIVEL LEG.
APPLICATION FILED SEPT. 22, 1919.

1,342,951.

Patented June 8, 1920.

Inventor:
William G. Gagné.
by his attorney

UNITED STATES PATENT OFFICE.

WILLIAM G. GAGNÉ, OF BOSTON, MASSACHUSETTS.

COLLAPSIBLE SWIVEL-LEG.

1,342,951.   Specification of Letters Patent.   Patented June 8, 1920.

Application filed September 22, 1919. Serial No. 325,517.

*To all whom it may concern:*

Be it known that I, WILLIAM G. GAGNÉ, a citizen of the United States, residing at Boston, in the county of Suffolk and State of Massachusetts, have invented new and useful Improvements in Collapsible Swivel-Legs, of which the following is a specification.

This invention relates to a leg for cooking and kitchen utensils, household furniture and the like, and has for its object to provide a leg which may be adaptable to all devices which are necessarily supported upon legs, where it is also desirable at times that said devices may be caused to occupy as little space as possible yet still have their legs in some way attached thereto to prevent loss or to facilitate packing, storing or shipping.

It is an object, therefore, of this invention to so construct a leg that a greater portion of the same may be removed from its normal vertical position in a permanently attached portion constituting a post and again inserted in said post at right angles to its former vertical position, whereupon both portions may be turned simultaneously until the detachable portion occupies a position entirely beneath and parallel with the underside of the device.

The invention consists in the combination and arrangement of parts set forth in the following specification and particularly pointed out in the claims thereof.

Referring to the drawings.

Like numerals refer to like parts throughout the several view of the drawings.

Figure 1:
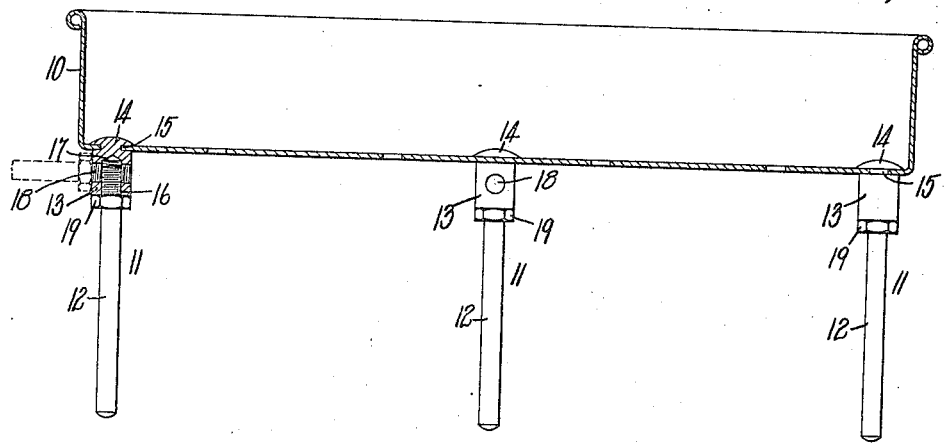
Figure 1 represents a vertical section, partly in elevation, illustrating my improved leg embodied in a cooking utensil.
Figure 2:
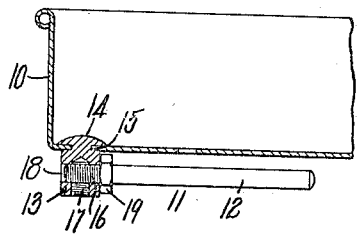
Fig. 2 is a vertical section similar to Fig. 1, illustrating one of my improved legs in its temporary collapsed position.

In the drawings, referring particularly to Figs. 1 and 2, 10 represents a cooking utensil intended for use within a kettle as a container for foods during the cooking of the same.

In order that the cooking utensil may be adaptable for different foods and for different methods of cooking the same, it is necessary that the cooking utensil shall at times be located at the bottom of the kettle. This is the case when the cooking utensil is being used for roasting meats. At other times it is necessary to have the cooking utensil lifted to quite an extent above the bottom of the kettle, as for example, when it is desired to steam cook certain types of food. It is preferable at such times to have the level of the water in the kettle below the bottom of the cooking utensil.

A plurality of legs 11 are therefore provided for the cooking utensil 10 and it is in these legs and their adaptability to all devices requiring the use of detachable legs that the novelty of this invention lies. The legs 11 are preferably formed in two parts, a lower detachable portion 12 which constitutes nearly the entire length of the leg and a short upper portion or post 13 which is permanently attached to the bottom of the cooking utensil preferably by riveting the same as at 14.

The post 13 is provided with a cylindrical shank 15 which extends through the bottom of the cooking utensil and the end of this shank is so riveted at 14 that the post 13 may swivel upon the bottom of the cooking utensil 10.

The upper end of the detachable portion 12 is screw threaded at 16 to fit a correspondingly screw-threaded vertical hole 17 provided in the post 13, or a horizontal hole 18 also provided in said post 13.

A nut 19 has screw-threaded engagement with the threaded end 16 of the detachable portion 12 of the leg 11 and is adapted to contact with the post 13.

The operation of this embodiment of my invention is as follows: When it is desired to use the cooking utensil as a receptacle in which food may be steamed and the legs are needed to give a required elevation to said cooking utensil within a kettle, the said legs occupy the position illustrated in Fig. 1. If, however, the cooking utensil is to be used for roasting purposes, it is necessary that the legs be shortened in order that said cooking utensil may occupy a position near the bottom of the kettle. The portion 12 of the leg 11 is therefore detached from its normal position in the post 13 by loosening the nut 19 and unscrewing the end 16 from the hole 17. The end 16 is then inserted in the hole 18, preferably for convenience, with the detachable portion 12 in the position illustrated by dotted lines Fig. 1. When the detachable portion 12 is securely fastened in position the post 13 is turned upon the bottom of the cooking utensil until said detachable portion 12 assumes the position illustrated in Fig. 2 where it is entirely beneath said cooking utensil. The cooking utensil may then rest upon the posts 13. With the legs in this position the cooking utensil may be packed and shipped without danger of losing the legs and at the same time only requiring a minimum amount of space.

Figure 3:
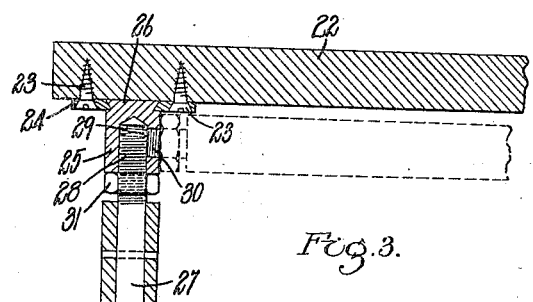
Figs. 3, 4 and 5 are each vertical sections partly in elevation illustrating various modified embodiments of my invention each being illustrated as attached to a table.

In Fig. 3 a leg embodying my invention is illustrated adaptable to a table. In this embodiment 22 represents the top of a table, to the underside of which is fastened by screws 23 a plate 24. A post 25 is provided with a cylindrical shank 26 which is riveted to said plate 24 in such a manner that said post may swivel upon said plate 24. A stud 27 provided with a screw-threaded end 28 is adapted to fit a similarly threaded vertical hole 29 provided in the post 25, or a horizontal hole 30 also provided in said post 25. A nut 31 is provided upon the stud 27 and is adapted to contact with the post 25. A leg 32 preferably constructed of wood is pinned or otherwise securely fastened to the stud 27 and forms together with said stud the detachable member of this embodiment of my invention.

Figure 4:
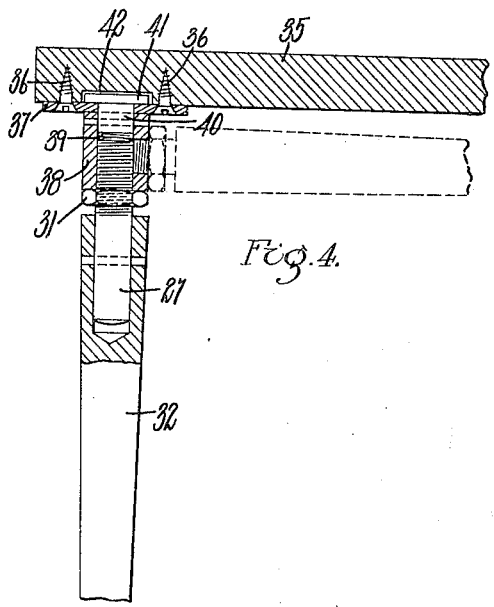

In Fig. 4 is illustrated another embodiment of my invention, the same being also adaptable to a table. In this embodiment 35 represents the top of a table, to the underside of which is fastened by screws 36 a plate 37. A post 38 has a hole 39 extending entirely therethrough and within the upper portion of this hole is pinned a plug 40 which is provided with a flange 41. The flange 41 is located within a recess 42 provided in the underside of the table top 35 and said flange 41 is adapted to engage the upper side of the plate 37, whereby the post 38 together with the plug 40 may swivel upon said plate 37. The leg 32, stud 27 and nut 31 comprising the detachable member are exactly like the corresponding parts previously described in connection with Fig. 3.

Figure 5:
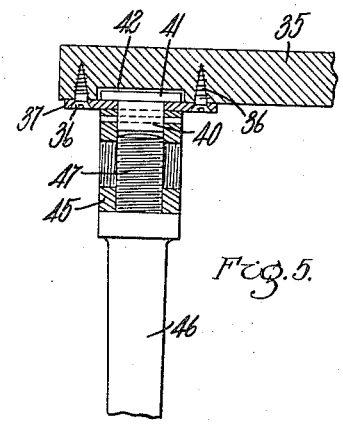

In Fig. 5 is illustrated still another embodiment of my invention, wherein a post 45 is adapted to swivel in exactly the same manner as previously described in connection with the device of Fig. 4. In this embodiment, however, a leg 46 has formed integral therewith a screw-threaded portion 47 which is adapted to screw into the post 45 in either a vertical or a horizontal position.

Each of the embodiments of my invention illustrated in Figs. 3, 4 and 5 perform the same functions and are operated in the same manner as previously described in connection with the device illustrated in Figs. 1 and 2.

Having thus specifically described my invention what I claim and desire by Letters Patent to secure is:

1. A leg having, in combination, a post adapted to swivel upon a stationary member about an axis extending longitudinally of said post, and a member detachably fastened to said post and normally in alinement therewith, said post being also provided with an opening adapted to receive said detachable member and position the same at right angles to its normal position.

2. A leg having, in combination, a post adapted to swivel upon a stationary member about an axis extending longitudinally of said post, a member detachably secured to said post and normally in longitudinal alinement therewith, means to lock said detachable member to said post, said post being also provided with an opening adapted to receive said detachable member and position the same at right angles to its normal position.

3. A leg having, in combination, a post adapted to be riveted to a stationary member, said post being also rotatable upon said stationary member, a member detachably fastened to said post and normally in alinement therewith, said post being also provided with an opening adapted to receive said detachable member and position the same at right angles to its normal position.

In testimony whereof I have hereunto set my hand in presence of two subscribing witnesses.

WILLIAM G. GAGNÉ.

Witnesses:
FRANKLIN E. LOW,
HERMAN R. HOFFMAN.